Dec. 27, 1927.  1,654,211
R. W. H. HOFSTEDE-CRULL
LUBRICATING DEVICE FOR VERTICAL ELECTROMOTOR
Filed June 5, 1924

Inventor
R. W. H. Hofstede-Crull
by Marks & Clerk
Attys.

Patented Dec. 27, 1927.

1,654,211

UNITED STATES PATENT OFFICE.

RENTO WOLTER HENDRIK HOFSTEDE-CRULL, OF DOETINCHEM, NETHERLANDS, ASSIGNOR TO NAAMLOOZE VENNOTTSCHAP DE VEREENIGDE IJZERFABRIEKEN "DE VIJF," OF DOETINCHEM, NETHERLANDS.

LUBRICATING DEVICE FOR VERTICAL ELECTROMOTORS.

Application filed June 5, 1924, Serial No. 718,173, and in the Netherlands September 25, 1923.

In the device according to the invention the lubricating oil is maintained in circulation from a central point by means of one or more pressure pumps which impel the oil through passages so arranged that when flowing from one bearing to a following bearing of the rotor shaft it remains out of contact with the windings.

To this end one or more passages or grooves of such a shape, preferably helically shaped, may be provided which contribute to the transference of the lubricating oil from one bearing to a following one. The extension of the rotor shaft may be constructed or shaped as a screw pump serving to maintain in circulation the lubricating oil for the bearings of the rotor shaft. The operation of this pump may be assisted by that of the helical or otherwise shaped passages or grooves in the rotor shaft.

It has been ascertained that with a device operating in this manner very intensive and continuous lubrication is obtained without danger of the rotor windings being smeared with oil. Further, by constructing the upper cap of the motor at the locality of the upper bearing as an oil collecting chamber around the rotor shaft, the washing of this bearing with oil is effected and there is thus obtained plentiful lubrication which is important when working at a high number of revolutions.

When the rotor shaft is extended upwards and passed through a third bearing, then this extended rotor shaft may be surrounded by a tube the lower end of which dips into the oil collecting chamber. Through this tube the lubricating oil supplied to the third bearing flows to the upper bearing of the rotor shaft without loss of oil. When the upper end of the rotor shaft is connected by a flexible coupling to a second shaft, then the tube which also surrounds this coupling may be provided with means for supplying the lubricating oil also to the said bearing. If desired, the tube may be surrounded by an oil- and air-tight jacket.

The maintenance of the rotor windings free from lubricating oil may also be attained by providing above the rotor on the rotor shaft a shield of such dimensions that it covers the stator windings and flings the lubricating oil, falling from the bearing above the shield on to the latter, outwardly into passages between the rotor casing and stator windings from which it is supplied to the following bearing.

In a practical embodiment according to the invention the electromotor with the oil pump and the other parts belonging to the lubricating device forms a unit, which, as such, may be lifted out of or inserted into the motor casing mounted on an oil tank.

If a plurality of electro-motors be used, then these electro-motors may be mounted on a common oil tank into which they extend with their extended motor-shafts constituting screw pumps.

These and other characteristics will be more fully explained hereinafter.

The drawings illustrate the invention in some examples.

Fig. 2 also shows how the motor when inserted into its casing makes contact with the rings or bars disposed in the oil tank.

Figure 1:
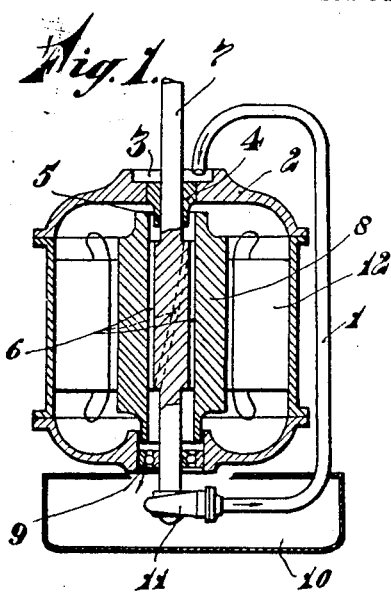
Fig. 1 is a section of a lubricating device having oil grooves in the rotor shaft.

In the construction according to Fig. 1 the lubricating oil flows from a by-pass 1 into an oil collecting chamber 3 formed in the upper cap 2, from which chamber it flows to the upper bearing 4 and lubricates the latter excessively. The funnel-shaped portion 5 of this bearing is preferably provided with helical grooves in order to secure the transference of the lubricating oil to also preferably helical passages or grooves 6 in the rotor shaft 7 and to prevent oil escaping outwardly over the edge of the hollow shaft or the tubular piece 8 into which the rotor shaft is inserted. After having left the passages 6, the oil passes to the lower bearing 9 and from here to the oil tank 10 into which dips the extended lower end 11 of the rotor shaft constructed as a screw pump. It will be clear that the screw pump in cooperation with the preferably helically wound oil passages 6 during rotation of the rotor shaft will maintain an intensive oil circulation whereby unrestricted lubrication of the bearings is guaranteed and at the same time contact of the oil with the stator windings 12 is effectively avoided.

Figure 2:
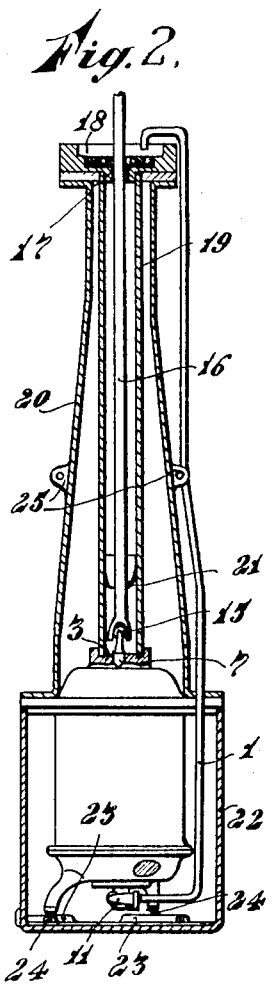
Fig. 2 shows an embodiment in longitudinal section in which the rotor shaft is connected by a flexible coupling to a second shaft and this shaft is surrounded by a piece of tube with surrounding oil and air tight jacket.

In the construction according to Fig. 2 the rotor shaft 7 is coupled to a second shaft 16 passing through a third bearing 17 by means of a flexible coupling 15 beyond the upper bearing of the rotor shaft. In this case the lubricating device is so constructed that the lubricating oil, which is forced upwardly through the by-pass 1 by the screw pump 11 formed by the extended lower end of the rotor shaft 7 and by the passages in the rotor shaft, not shown, is not guided through the said by-pass directly to the upper bearing 4 of the rotor shaft but is led to the third bearing 17. To this end the by-pass 1 terminates above an oil collecting chamber 18 formed above the bearing 17. The oil flows from the bearing 17 to the flexible coupling 15, a tube 19, surrounding the second shaft 16 from the bearing 17, taking care that the oil is not flung away.

The tube 19 rests with its lower end in the oil collecting chamber 3 located above the upper bearing of the rotor shaft. A dust and oil tight jacket 20 surrounds the tube 19. Means such as guiding plates 21 may be provided in the tube 19 to lead the oil to the coupling 15. From this coupling it flows through the chamber 3 to the upper bearing of the rotor shaft and thence to the screw pump 11 which dips into the oil tank. This oil tank carries a casing 22 for the motor. The tank may be larger and serve as a common tank for a plurality of motors with their casings. In the oil tank the current supply wires are connected to annular contacts or double bars 23. When the motor occupies the position illustrated, inserted in its casing 22, then contacts 24 at the bottom of the motor engage the bars, so that the motor is then supplied with current. The construction is such that, when the motor by means of the lugs 25 of the jacket 20 is turned through a certain angle, the contacts 24 are freed from the current conducting bars 23 and the motor is then currentless. The rotation is not hindered by the oil-by-pass 1 as this by-pass is passed through the flanges of the upper motor cap and of the jacket 20.

It goes without saying that the construction shown presents only by way of example supporting means of the motor in its casing and a contact device, which, if desired, may be departed from within the spirit of the invention. This remark applies also to other structural details.

Figure 3:
Fig. 3 shows to a larger scale an oil groove in the rotor shaft in section, the shape shown being preferred.

Finally in Fig. 3 a shape of groove is shown which is important for a satisfactory conveying action on the lubricating oil. In Fig. 3, 7 indicates the rotor shaft in section and the arrow indicates the direction of rotation. The groove 6 is blade-shaped in section with the scooping edge 26 rotating in the direction of the arrow.

The lugs 25 illustrated in Fig. 2 may also be provided at another position and may co-operate with stops (not shown) arranged on the stationary motor casing for securing the right position of the motor contacts on insertion into the casing.

Having now particularly described and ascertained the nature of my said invention, and in what manner the same is to be performed, I declare that what I claim is:—

1. In combination, a vertical electro-motor including a rotor shaft and upper and lower bearings, a lubricating oil tank, a passage-connection located outside of the motor, said motor having internal passages leading from the upper to the lower bearings, and pressure pumping means connected with the lower end of the rotor shaft for maintaining in circulation the lubricating oil from the tank through the passage-connection to the upper shaft bearing and from the latter through said passages to the lower bearing and from the latter back to the tank, the internal passages in the motor being constituted by helical grooves provided in the rotor shaft.

2. In combination, a vertical electro-motor including an extended rotor shaft having helical passages therein, upper and lower bearings for said shaft, a lubricating oil tank, a passage-connection located outside the motor, a screw pump forming part of the lower end of the extended rotor shaft for maintaining in circulation the lubricating oil from the tank through the passage-connection to the upper shaft bearing and from the latter through said passages to the lower bearing and from the latter back to the tank.

3. In combination, a vertical electro-motor including a rotor shaft having helical passages therein, upper and lower bearings for said shaft, a lubricating oil tank, a passage-connection located outside of the motor, said helical passages leading from the upper to the lower bearings, and pressure pumping means connected with the lower end of the rotor shaft for maintaining in circulation the lubricating oil from the tank through the passage-connection to the upper shaft bearing and from the latter through said passages to the lower bearing and from the latter back to the tank, said motor also including an upper cap located adjacent the upper bearing and having an oil collecting chamber for receiving oil from the passage-connection.

In testimony whereof I affix my signature.

RENTO WOLTER HENDRIK HOFSTEDE-CRULL.